United States Patent
Katsaros et al.

(10) Patent No.: US 9,879,732 B2
(45) Date of Patent: Jan. 30, 2018

(54) UNIVERSAL JOINT

(71) Applicants: Padelis Katsaros, Schweinfurt (DE);
Volker Wendt, Üchtelhausen/Zell (DE)

(72) Inventors: Padelis Katsaros, Schweinfurt (DE);
Volker Wendt, Üchtelhausen/Zell (DE)

(73) Assignee: AKTIEBOLAGET SKF, Gothenburg (SE)

( * ) Notice: Subject to any disclaimer, the term of this patent is extended or adjusted under 35 U.S.C. 154(b) by 57 days.

(21) Appl. No.: 14/870,669

(22) Filed: Sep. 30, 2015

(65) Prior Publication Data

US 2016/0091027 A1    Mar. 31, 2016

(30) Foreign Application Priority Data

Sep. 30, 2014   (DE) .................. 10 2014 219 859

(51) Int. Cl.
*F16D 3/41* (2006.01)
*F16C 33/76* (2006.01)
(Continued)

(52) U.S. Cl.
CPC .............. *F16D 3/385* (2013.01); *F16C 19/44* (2013.01); *F16C 25/08* (2013.01); *F16C 33/768* (2013.01);
(Continued)

(58) Field of Classification Search
CPC ........ F16C 19/44; F16C 21/005; F16C 25/08; F16C 33/768; F16C 33/7809;
(Continued)

(56) References Cited

U.S. PATENT DOCUMENTS 2,755,113 A * 7/1956 Baumheckel ......... F16C 33/783
                                                         277/369
4,932,923 A    6/1990 Thompson
(Continued)

FOREIGN PATENT DOCUMENTS

DE    3118430 A1 * 11/1982    .......... F16C 33/7809
DE    4408831 A1    9/1995
(Continued)

OTHER PUBLICATIONS

"The Advantages and Disadvantages of Deep Drawing." Charles Richter Metal Stamping & Spinning Corporation. Jul. 16, 2014, [online], [retrieved on Jan. 19, 2017] Retrieved from the Internet <URL: http://www.charlesrichter.com/the-advantages-and-disadvantages-of-deep-drawing/ >.*
(Continued)

*Primary Examiner* — Josh Skroupa
(74) *Attorney, Agent, or Firm* — Bryan Peckjian; SKF USA Inc. Patent Dept.

(57) ABSTRACT

A universal joint includes a joint cross having a plurality of bearing journals, each bearing journal being supported in a bearing bushing by a plurality of trunnion bearing rolling elements, the universal joint also including a seal assembly configured to seal the journal cross against the bearing bushing. The bearing bushing includes a sleeve for slidingly supporting at least one seal lip of the seal assembly, the sleeve has an axially inner region facing the rolling elements, and the axially inner region has a radially inner portion and a radially outer portion. The radially inner portion is axially offset from the radially outer portion towards the rolling elements by an offset amount.

18 Claims, 3 Drawing Sheets

(51) Int. Cl.
*F16D 3/38* (2006.01)
*F16J 15/3256* (2016.01)
*F16C 19/44* (2006.01)
*F16C 25/08* (2006.01)

(52) U.S. Cl.
CPC ............ *F16D 3/41* (2013.01); *F16J 15/3256* (2013.01); *F16D 2300/08* (2013.01)

(58) Field of Classification Search
CPC  F16C 33/783; F16C 33/7869; F16C 33/7876; F16C 33/7883; F16C 2323/06; F16D 3/385; F16D 3/41; F16D 2300/08; F16J 15/3204; F16J 15/3232; F16J 15/3252; F16J 15/3256; F16J 15/3268
USPC .......................................... 464/130–133, 905
See application file for complete search history.

(56) References Cited

U.S. PATENT DOCUMENTS

| | | | |
|---|---|---|---|
| 5,597,356 A | | 1/1997 | Rieder |
| 9,464,720 B2* | | 10/2016 | Brunetti .............. F16C 33/7869 |
| 2004/0171427 A1 | | 9/2004 | Wagner |
| 2004/0204249 A1 | | 10/2004 | Grupido |
| 2009/0123099 A1* | | 5/2009 | Dickerhoff ............ F16C 33/768 |
| | | | 384/459 |

FOREIGN PATENT DOCUMENTS

| | | | | |
|---|---|---|---|---|
| DE | 10302069 A1 | | 7/2004 | |
| DE | 10347361 A1 * | | 5/2005 | ............ F16C 33/783 |
| DE | 102005053558 A1 | | 5/2007 | |
| EP | 0006995 A1 * | | 1/1980 | ............ F16J 15/3268 |
| EP | 1881217 A2 * | | 1/2008 | ............ F16C 33/783 |
| JP | 4544401 B2 * | | 9/2010 | ............ F16C 33/783 |
| JP | 4666392 B2 * | | 4/2011 | ............ F16C 33/783 |
| JP | 5105066 B2 * | | 12/2012 | ............ F16C 33/783 |
| WO | WO 0123789 A1 * | | 4/2001 | ............ F16C 33/7876 |
| WO | WO 2007052685 A1 * | | 5/2007 | ............ F16C 33/7876 |
| WO | WO 2008155964 A1 * | | 12/2008 | ............ F16C 33/783 |
| WO | WO 2009022569 A1 * | | 2/2009 | ............ F16J 15/3264 |
| WO | WO 2009119036 A1 * | | 10/2009 | ............ F16C 33/783 |
| WO | WO 2011086982 A1 * | | 7/2011 | ............ F16C 33/783 |
| WO | WO 2014091781 A1 * | | 6/2014 | ............ F16C 33/7876 |

OTHER PUBLICATIONS

Translation of DE 3118430 A1. Kessell, et al. Sealing for the mounting of the crosspiece of a universal joint. Nov. 25, 1982.*

* cited by examiner

UNIVERSAL JOINT

CROSS-REFERENCE

This application claims priority to German patent application no. 10 2014 219 859.3 filed on Sep. 30, 2014, the contents of which are fully incorporated herein by reference.

TECHNOLOGICAL FIELD

The disclosure relates to a universal joint having a joint cross/spider, which joint cross includes a of bearing journals. Each of the bearing journals is supported in a bearing bushing by a trunnion bearing, and a seal assembly is provided for sealing the joint cross against the bearing bushing.

BACKGROUND

An example of a universal joint of the above-described type, sometimes called a Cardan joint, is described in DE 103 02 069 A1 (a family member of U.S. Pat. No. 7,258,490). In such universal joints, disc springs are typically used in the trunnion bearings to apply an axial force on the rolling elements. The use of disc springs ensures that if the rolling elements are joggled or displaced while under load, they will be brought back into their proper coaxial orientation when the load is removed (when the bearing returns to an unloaded state). The universal joint can thereby be protected from excessive wear, friction, and material stress.

Furthermore, universal joints of the above-described type are generally provided with seals to protect the trunnion bearing, which bearing is usually embodied as a needle bearing. These seals must function in the presence of highly abrasive contaminants. For example, bearings used in motor vehicles, especially those that operate in dusty environments like construction zones, may be exposed to contaminants that can contaminate the universal joints.

To date inner and outer seals (two separate seal systems) have been used in universal joints. By way of example, reference is made to the above-mentioned DE 103 02 069 A1, that shows separate inner and outer seals.

The use of the disc springs in conventional universal joint bushings increases manufacturing expense and installation effort.

Furthermore, it has been found that elastomeric seal lips sometimes do not provide an optimal sealing against water, sand, and mud. Instead, adequate sealing can only be achieved by using an inner seal and an outer seal. This can easily lead to wear on the outer seal lip.

A disadvantage of conventional trunnion bearings, including those in the cited document, is that they require a construction of a relatively expensive inner seal in order to ensure that penetrating dirt is kept away from the region of the trunnion bearing. Conventional assemblies that use two separate seal systems and disc springs are thus expensive and correspondingly expensive to manufacture and install.

SUMMARY

An aspect of the disclosure is to provide a universal joint of the above-described type that ensures good guiding of the rolling elements of the trunnion bearing with low manufacturing costs. Furthermore, an effective yet economical sealing function can also be achieved.

The disclosed universal joint is characterized in that a sleeve is attached in the bearing bushing for slidingly contacting (sometimes referred to as "frictional running") at least one seal lip of the seal assembly. The sleeve includes at least two portions radially offset in a region facing the rolling elements of the trunnion bearing, namely at least one radially outer portion and at least one radially inner portion, and the radially inner portion is axially offset towards the rolling elements with respect to the radially outer portion by an offset amount.

The amount of offset is preferably from 0.1 mm to 10.0 mm, and preferably from 0.25 mm to 4.0 mm.

The radially outer portion and the radially inner portion preferably extend annularly about the axis of the sleeve and are preferably configured to be plateau-shaped.

The sleeve is preferably press-fit in a cylindrical receiving surface of the bearing bushing and is preferably formed as a deep-drawn component.

The seal assembly preferably includes a seal body that sits on the joint cross in a statically sealing manner. The seal body includes at least one first radially-outward oriented or radially-inward oriented seal lip that runs on the bearing bushing or on the sleeve in a dynamically sealing manner, and at least one second radially-outward oriented or radially-inward oriented seal lip that runs on the bearing bushing or on the sleeve in a dynamically sealing manner. The seal body, including all of its seal lips, is formed as a one-part polymer component, and the seal assembly is free from any further seal body. Here the seal body is comprised in particular of polyurethane or of a thermoplastic elastomer (TPE).

According to a preferred embodiment, the sleeve is U-shaped in radial section, with the base of the U-shaped structure facing the rolling elements of the trunnion bearing. A first arm of the U-shaped structure is press-fit in the cylindrical receiving surface of the bearing bushing, and the base of the U-shaped structure includes the radially inner and radially outer portions. In this case the sleeve can include a second arm, on whose radially outer-lying surface the sealing body runs in a dynamically sealing manner with a third radially-inward oriented seal lip.

In another preferred embodiment the sleeve has a first arm extending in the axial direction and a section that is doubly corrugated (doubly folded/has first and second folded portions) in radial section, and the first seal lip and a third seal lip are radially offset on the doubly corrugated section. The doubly corrugated section forms the radially inner and radially outer portions.

In the latter case the first seal lip and the third seal lip may be formed on the ends of axially extending projections that extend away from the base body of the seal body and towards the trunnion bearing.

Furthermore, the seal body can include a fourth seal lip that runs on an end side of the bearing bushing in a dynamically sealing manner.

The first arm of the sleeve can project past the axial end of the bearing bushing and protrude into an annular space that is formed in the seal body. The first arm of the sleeve can include an end section extending radially, preferably outward, which is placed in the annular space.

The proposed seal assembly thus represents an optimized seal concept for universal joint bushings.

Furthermore, however, the sleeve mentioned having the radially inner and radially outer portion then represents in a very advantageous manner a resilient metal-plate insert for the universal joint bushing, which after its installation provides a functionality that makes a disc spring in the bushing unnecessary.

Thus a functionally flawless and cost-effective universal joint bushing is provided in an advantageous manner, and can be cost-effectively manufactured with an integrated spring function. Thus not only manufacturing costs but also installation costs can be reduced.

The rolling elements of the trunnion bearing are thus optimally guided and oriented, and a shifting or rattling or joggling of the rolling elements is thereby prevented.

The shape of the pressed-in sleeve is chosen such that in the fitting region (i.e. in the radially outer portion of the sleeve) the rolling elements of the trunnion bearing do not contact the sleeve. Rather, due to the shape of the sleeve an abutment of the rolling elements on the sleeve is made possible radially further in (toward the center of rotation of the bearing). The claimed design of the sleeve ensures a strong spring action of the sleeve in the radially inner portion, i.e., in the contact region of the rolling elements. Thus in the event of a shifting or joggling of the rollers (rolling elements of the trunnion bearing) contact by the rolling elements with the radially outer portion of the sleeve cannot occur. This is beneficial because, under certain circumstances, such contact would disadvantageously lead to deformations of the seal.

A good spring action is achieved by the aforementioned corrugated shape of the sleeve in the axial end region. The production of the sleeve in a deep-drawing process is possible in a cost-effective manner. The use of a disc spring is, as mentioned above, therefore unnecessary, which has a cost-saving effect.

The disclosure is based on a recognition that a buffer-seal function against water, dirt, and sand can be provided that performs an important sealing function. It is advantageous in this context to use polyurethane or a thermoplastic elastomer (TPE) as the elastomer for the seal material, which have a high resistance against water, dirt, and sand.

The disclosed concept provides that the inner sealing function can also be entirely assumed by polyurethane or thermoplastic elastomer (TPE) and the necessary seal lips can protrude from these seal elements into the inner sealing region. This has the advantage that the inner structure does not require any vulcanized-on seal lips, but rather at most requires a metal-plate part (sleeve) as the counter-surface for the seal lips to slide against. This in turn makes the seal more economical to manufacture or implement.

Polyurethane or a thermoplastic elastomer (TPE) is a very suitable material for the seal element, as these materials are resistant to dirt and water. The use of these materials leads to an improved sealing function. The disclosed concept provides that the entire seal system, i.e., the inner and the outer seal element including all provided or required seal lips, can be provided by the buffer seal, and in this manner make unnecessary a second, separate inner seal.

Accordingly the seal system can be manufactured more economically, without the proven and required sealing function having to be omitted. The integrated solution of the inner and outer seal of the universal joint bearing thus represents an embodiment of a seal against entry of water and dirt that is optimized in terms of function and cost.

The disclosed concept can be used for all types of universal joints, although applications in the motor vehicle industry are particularly preferred.

The disclosed arrangement also, advantageously, effectively retains lubricant, i.e., in particular lubricating grease. The seal is well-anchored in the bushing and thus stable. The rollers of the trunnion bearing can be axially loaded and remain precisely aligned.

Dirt is effectively kept out, and the design of the seal assembly allows the bearing to be lubricated with grease.

The buffer seal can be prepositioned well, and this helps ensure a sealing or anchoring on the cross.

BRIEF DESCRIPTION OF THE DRAWINGS

Exemplary embodiments of the invention are depicted in the drawings.

DETAILED DESCRIPTION

Figure 1:
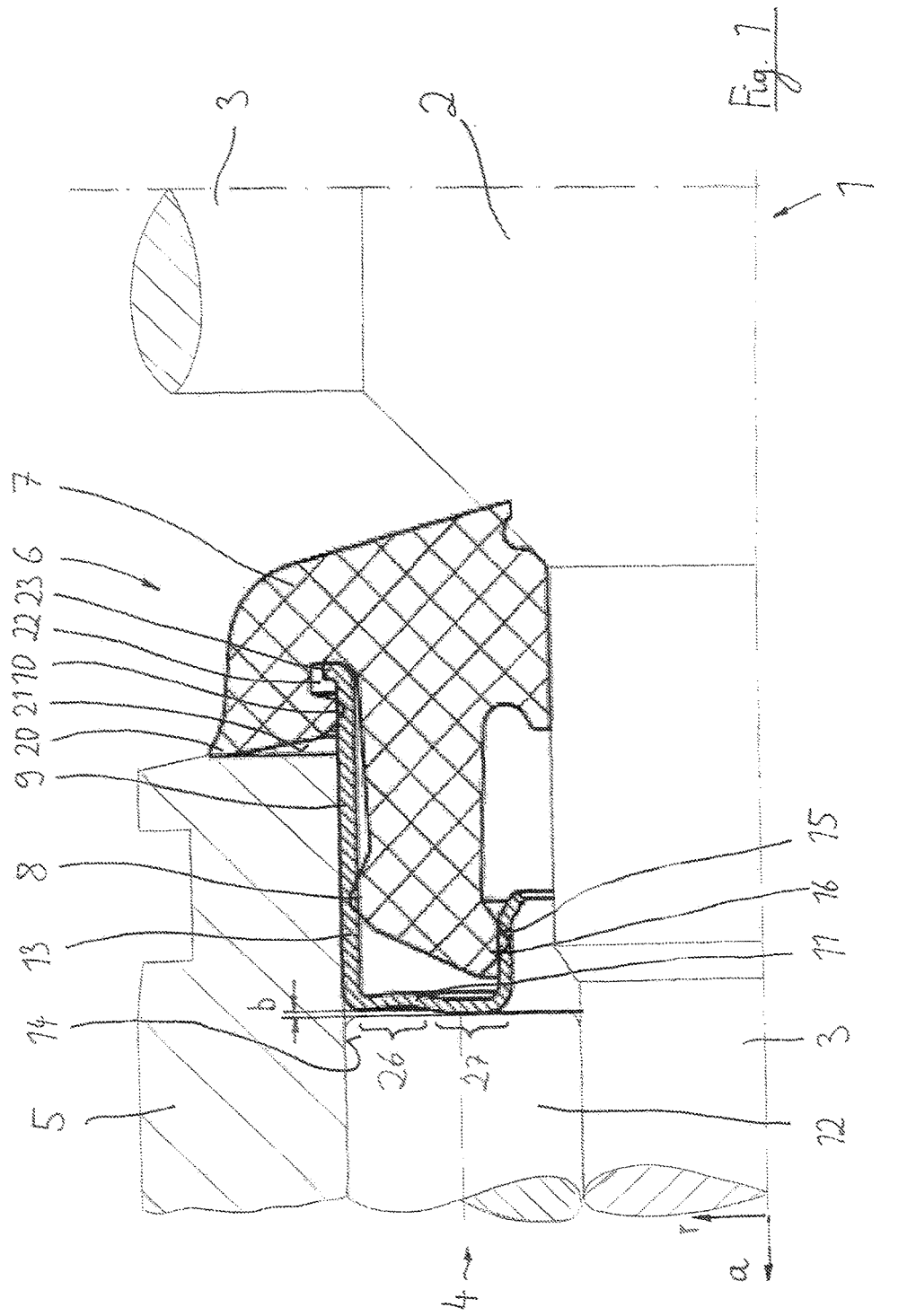
FIG. 1 is a radial sectional view of part of a universal joint according to the present disclosure that includes a seal assembly for sealing a section of a joint cross with respect to a bearing bushing.

FIG. 1 illustrates two of four bearing journals 3 of a universal joint 1 that includes a joint cross 2. The bearing journals 3 are supported in respective trunnion bearings 4. The trunnion bearings 4 are housed in bearing bushings 5, or the bearing bushings 5 may be components of the trunnion bearings 4. In this embodiment, the trunnion bearing 4 is embodied as a needle bearing.

A seal assembly 6 for sealing the trunnion bearing 4 of each bearing bushing 5 is located on the joint cross 2.

The seal assembly 6 includes a seal body 7 configured as a one-piece element (a monoblock) that sits on the joint cross 2 in a statically sealing manner. In the exemplary embodiment of FIG. 1 the seal body 7 includes a first radially-outward oriented seal lip 8, configured to run in a dynamically sealing manner on the bearing bushing 5, or more precisely, on a sleeve 9 that is connected to the bearing bushing 5 so that the sleeve 9 rotates conjointly with the bearing bushing 5. The seal body 7 further includes a second radially-inward oriented seal lip 10 that runs in a dynamically sealing manner on the bearing bushing 5—in this embodiment also on the sleeve 9. As can be seen, the seal body 7 including the first and second seal lips 8 and 10 is configured as a one-part polymer component. The seal body is specifically comprised of polyurethane; a thermoplastic elastomer (TPE) could be used as an alternative. As can further be seen, the seal assembly 6 is the only one on a give arm of the joint cross, and the seal assembly 6 does not include any further seal bodies.

It can be seen from FIG. 1 that the sleeve 9 is a metal-plate part that is U-shaped in radial section. The base 11 of the U-shaped structure faces the rolling elements 12 (i.e., the needles) of the trunnion bearing 4. A first, radially outer arm 13 of the sleeve 9 is press fitted in a cylindrical receiving surface 14 of the bearing bushing 5. A second, radially inner arm 15 of the sleeve 9 points in axial direction a, and a third radially-inner oriented seal lip 16 of the seal body 7 runs on the radially outer surface of the second arm 15.

It is important that the sleeve 9 have two portions 26 and 27 that are radially offset from one another in a region facing the rolling elements 12 of the trunnion bearing 4. The first portion 26 is a radially outer portion 26 and the second portion 27 is a radially inner portion 27. The radially inner portion 27 is offset with respect to the radially outer portion 26 in the axial direction a by an offset amount towards the rolling elements 12. The amount of offset is usually from 0.25 mm to 4.0 mm. The radial offset is measured from an axially innermost surface of the first portion 26 to an axially innermost surface of the second portion 27.

In the present embodiment both the radially outer portion 26 and the radially inner portion 27 are annular and encircle the axis of the sleeve 9 and form plateaus. The rollers 12 of the trunnion bearing 4 can run axially on the plateau of the radially inner portion 27. As a result, even if they joggle or are displaced during operation, they are realigned to be coaxial to the axis of the trunnion bearing.

The aforementioned configuration of offset plateaus provides a spring action that makes the use of a disc spring in the trunnion bearing unnecessary.

It is also to be noted that in the exemplary embodiment a fourth seal lip 20 is formed on the seal body 7, which fourth seal lip 20 runs on an axially facing end side 21 of the bearing bushing 5.

A further feature is that an annular space 22 is formed in the seal body 7, in which axial space 22 the sleeve 9, specifically, the first arm 13 of the sleeve 9, is disposed. The first end of the arm 13 has an end section 23 that extends radially outward, and this configuration helps to improve a sealing effect.

Figure 2:
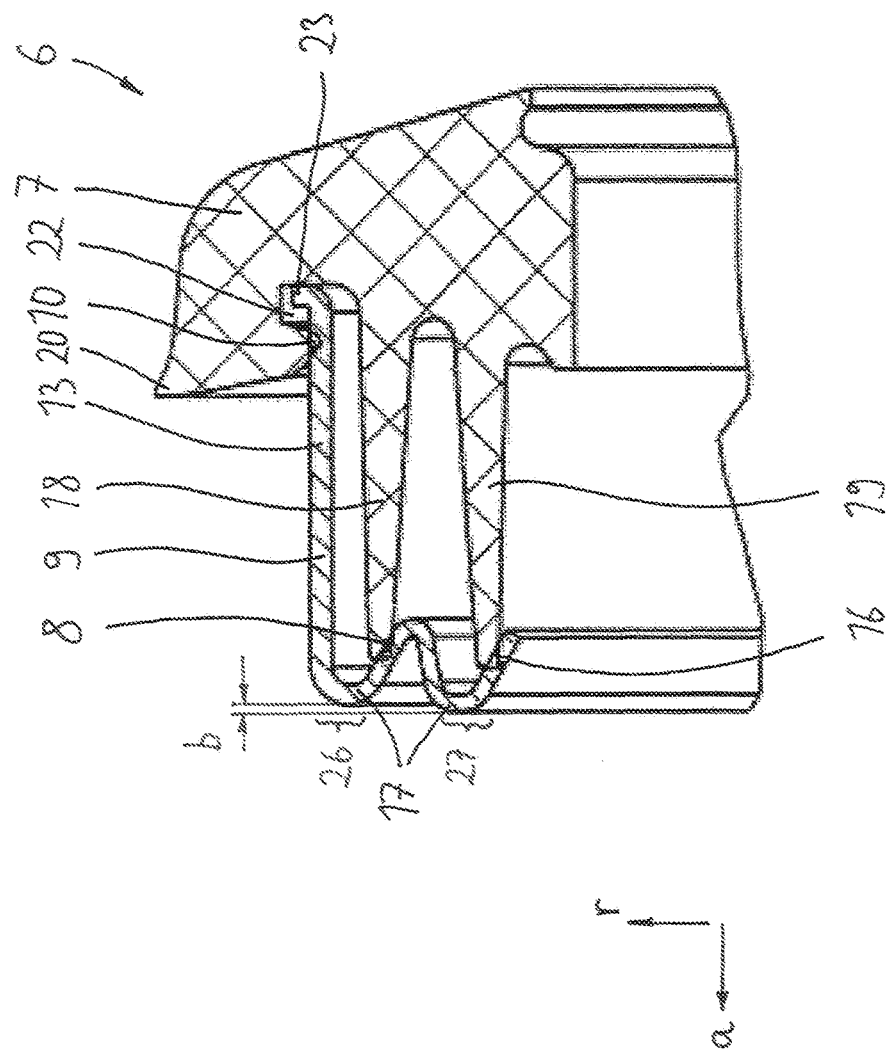
FIG. 2 is a radial sectional view of another embodiment of the seal assembly of FIG. 1.

An alternate embodiment is illustrated in FIG. 2. In this embodiment, the seal body 7 includes two axial projections 18 and 19 (first and second projections) that, respectively, slidingly support the first seal lip 8 and the third seal lip 16 on end portions of the first and second projections 18, 19.

The sleeve 9 in this embodiment also has a first arm 13, and an end section 17 of the arm that extends generally radially inward is folded or undulated in a manner that produces first and second generally axially facing surfaces for slidingly supporting the first and second axial projections 18, 19. The two axial projections 18 and 19 are radially offset from each other in direction r. The end section 17 of the sleeve also includes two portions 26 and 27 that are axially offset from one another by an amount b. Otherwise, this embodiment is generally similar to that depicted in FIG. 1.

Of course, variations in construction are also possible. Thus, for example, the use of only one seal lip 8 or 16 is also possible.

Figure 3:
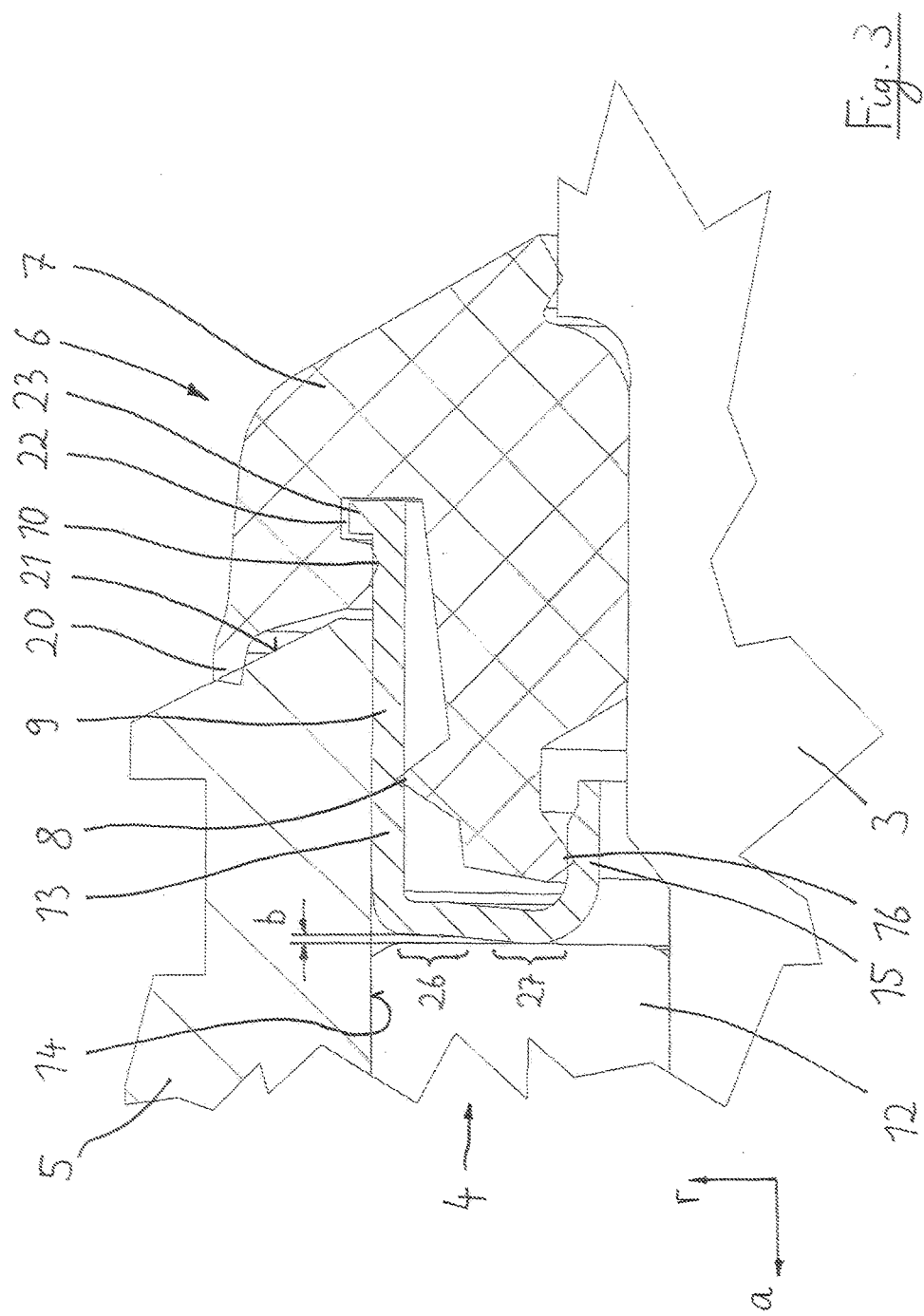
FIG. 3 is a radial sectional view of another embodiment of the seal assembly of FIG. 1.

FIG. 3 illustrates another embodiment in which the region of the fourth seal lip 20 is configured somewhat differently from the first and second embodiments. In this case, the seal lip 20 is cantilevered or somewhat more free so that it has greater flexibility or elasticity.

This configuration helps ensure that the seal lip 20—as depicted—abuts on the end side of the bearing bushing 5 even in the case of large deformations of the universal joint. In the drawing figures, the seal lips are shown extending into their respective sealing surfaces. Obviously, the seal lips will flex so as to ride on their respective seal surfaces. They are shown in their untensioned state to provide an indication of the how much flexing is required to make them sit on their guiding surfaces when installed. This helps ensure that seal lip 10 maintains a proper seal even with large deformations of the seal lip 20.

As in the embodiment of FIG. 1, the sleeve 9 of the embodiment of FIG. 3 includes the two radially spaced portions 26 and 27 that are axial offset from one another by axial offset amount b.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved universal joints and seals therefor.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Universal joint
2 Joint cross
3 Bearing journal
4 Trunnion bearing
5 Bearing bushing
6 Seal assembly
7 Seal body
8 First seal lip
9 Sleeve
10 Second seal lip
11 Base of the U-shaped structure
12 Rolling elements of the trunnion bearing
13 First arm
14 Cylindrical receiving surface of the bearing bushing
15 Second arm
16 Third seal lip
17 Rounded section/corrugated section
18 Extension
19 Extension
20 Fourth seal lip
21 End side of the bearing bush
22 Annular space
23 Radially extending end section
26 Radially outer portion of the sleeve
27 Radially inner portion of the sleeve
Radial direction
a Axial direction
Offset amount

What is claimed is:

1. A universal joint including a joint cross, the joint cross having a plurality of bearing journals, each bearing journal being supported in a bearing bushing by a plurality of trunnion bearing rolling elements, the universal joint also including a seal assembly configured to seal the journal cross against the bearing bushing, wherein the bearing bushing includes a sleeve for slidingly supporting at least one seal lip of the seal assembly, the sleeve including an axially inner region facing the rolling elements, the axially inner region having a radially inner portion and a radially outer portion, wherein the radially inner portion is axially offset from the radially outer portion towards the rolling elements by an offset amount, and wherein the sleeve is fixed against rotation relative to the bearing bushing and the seal assembly is fixed against rotation relative to the bearing journal and wherein the at least one seal lip of the seal assembly contacts the sleeve and is configured to slide along the sleeve when the bearing journal rotates in the bearing bushing.

2. The universal joint according to claim 1, wherein the offset amount is from 0.25 mm to 4.0 mm.

3. The universal joint according to claim 1, wherein the radially outer portion and the radially inner portion are annular and form first and second plateaus.

4. The universal joint according to claim 1, wherein the sleeve is press fitted against a cylindrical receiving surface of the bearing bushing.

5. The universal joint according to claim 1, wherein the sleeve is formed as a deep-drawn component.

6. The universal joint according to claim 1, wherein the seal assembly includes only one seal body mounted on each arm of the joint cross in a statically sealing manner, wherein the seal body includes at least one first radially oriented seal lip slidingly mounted on the bearing bushing or on the sleeve in a dynamically sealing manner, wherein the seal body includes at least one second radially oriented seal lip slidingly mounted on the bearing bushing or on a housing in a dynamically sealing manner, and wherein the seal body, at least one first radially oriented sealing lip and at least one second radially oriented sealing lip are formed as one piece.

7. The universal joint according to claim 6, wherein the seal body is comprised of polyurethane or of a thermoplastic elastomer (TPE).

8. The universal joint according to claim 1, wherein the sleeve includes a first arm extending in axial direction and a doubly folded section at an end of the first arm comprising a radially inner fold and a radially outer fold, wherein the first seal lip and a third seal lip are configured to slidingly engage the radially inner fold and the radially outer fold.

9. The universal joint according to claim 1,
wherein the offset amount is from 0.25 mm to 4.0 mm,
wherein the radially outer portion and the radially inner portion are annular and form first and second plateaus,
wherein the sleeve is press fitted against a cylindrical receiving surface of the bearing bushing,
wherein the sleeve is formed as a deep-drawn component,
wherein the seal assembly includes only one seal body mounted on each arm of the joint cross in a statically sealing manner,
wherein the seal body includes at least one first radially oriented seal lip slidingly mounted on the bearing bushing or on the sleeve in a dynamically sealing manner,
wherein the seal body includes at least one second radially oriented seal lip slidingly mounted on the bearing bushing or on a housing in a dynamically sealing manner,
wherein the seal body, at least one first radially oriented sealing lip and at least one second radially oriented sealing lip are formed as one piece, and
wherein the seal body is comprised of polyurethane or of a thermoplastic elastomer.

10. The universal joint according to claim 1, wherein the radially inner portion includes an axially innermost surface and the radially outer portion includes an axially innermost surface and wherein the axially innermost surface of the radially inner portion is axially offset from the axially innermost surface of the radially outer portion by the offset amount.

11. The universal joint according to claim 1, wherein the sleeve directly contacts the plurality of trunnion bearing rolling elements.

12. The universal joint according to claim 1, wherein the radially inner portion directly contacts the plurality of trunnion bearing rolling elements.

13. A universal joint including a joint cross, the joint cross having a plurality of bearing journals, each bearing journal being supported in a bearing bushing by a plurality of trunnion bearing rolling elements, the universal joint also including a seal assembly configured to seal the journal cross against the bearing bushing, wherein the bearing bushing includes a sleeve for slidingly supporting at least one seal lip of the seal assembly, the sleeve including an axially inner region facing the rolling elements, the axially inner region having a radially inner portion and a radially outer portion, wherein the radially inner portion is axially offset from the radially outer portion towards the rolling elements by an offset amount, and wherein the sleeve is U-shaped in radial section and includes a base and first and second arms, wherein the base faces the rolling elements of the trunnion bearing, and wherein the first arm is press-fit in a cylindrical receiving surface of the bearing bushing, and wherein the radially inner portion and the radially outer portion comprise part of the base.

14. The universal joint according to claim 13, wherein the second arm includes a radially outer-lying surface configured to slidingly support a third seal lip of the seal body in a dynamically sealing manner.

15. A universal joint comprising:
a joint cross having first, second, third and fourth bearing journals,
first, second, third and fourth bearing bushings, the first bearing journal being supported in the first bearing bushing by a first plurality of rolling elements to form a first trunnion bearing, the second bearing journal being supported in the second bearing bushing by a second plurality of rolling elements to form a second trunnion bearing, the third bearing journal being supported in the third bearing bushing by a third plurality of rolling elements to form a third trunnion bearing, and the fourth bearing journal being supported in the fourth bearing bushing by a fourth plurality of rolling elements to form a fourth trunnion bearing,
a plurality of unitary seal elements comprising first, second third and fourth unitary seal elements, the first seal element sealing the joint cross against the first bearing bushing, the second seal element sealing the joint cross against the second bearing bushing, the third seal element sealing the joint cross against the third bearing bushing, and the fourth seal element sealing the joint cross against the fourth bearing bushing,
wherein the first unitary seal element includes a first seal lip and a second seal lip;
wherein the first bearing bushing includes a sleeve including an axially inner region facing the first plurality of rolling elements, the axially inner region having a radially inner portion and a radially outer portion,
wherein the first seal lip and the second seal contact the sleeve and are configured to slide on the sleeve and rotate with the first bearing journal relative to the sleeve when the first bearing journal rotates; and wherein an axially innermost surface of the radially inner portion is axially offset from an axially innermost surface of the radially outer portion towards the rolling elements by an offset amount.

16. The universal joint according to claim 15, wherein only a single one of the plurality of unitary seal elements surrounds each of the first, second, third and fourth arms of the joint cross.

17. The universal joint according to claim 15, wherein the sleeve is U-shaped in radial section and includes a base and first and second arms, wherein the base faces the first plurality of rolling elements, wherein the first arm is press-fit in a cylindrical receiving surface of the bearing bushing, and wherein the radially inner portion and the radially outer portion comprise part of the base.

18. The universal joint according to claim 15, wherein the axially inner region comprises a doubly folded section having a radially inner fold and a radially outer fold, wherein the first seal lip is configured to slidingly engage the radially inner fold and the second seal lip is configured to slidingly engage the radially outer fold.

* * * * *